G. W. SMITH.
DIVING APPARATUS.
APPLICATION FILED MAR. 21, 1910.
975,727.
Patented Nov. 15, 1910.
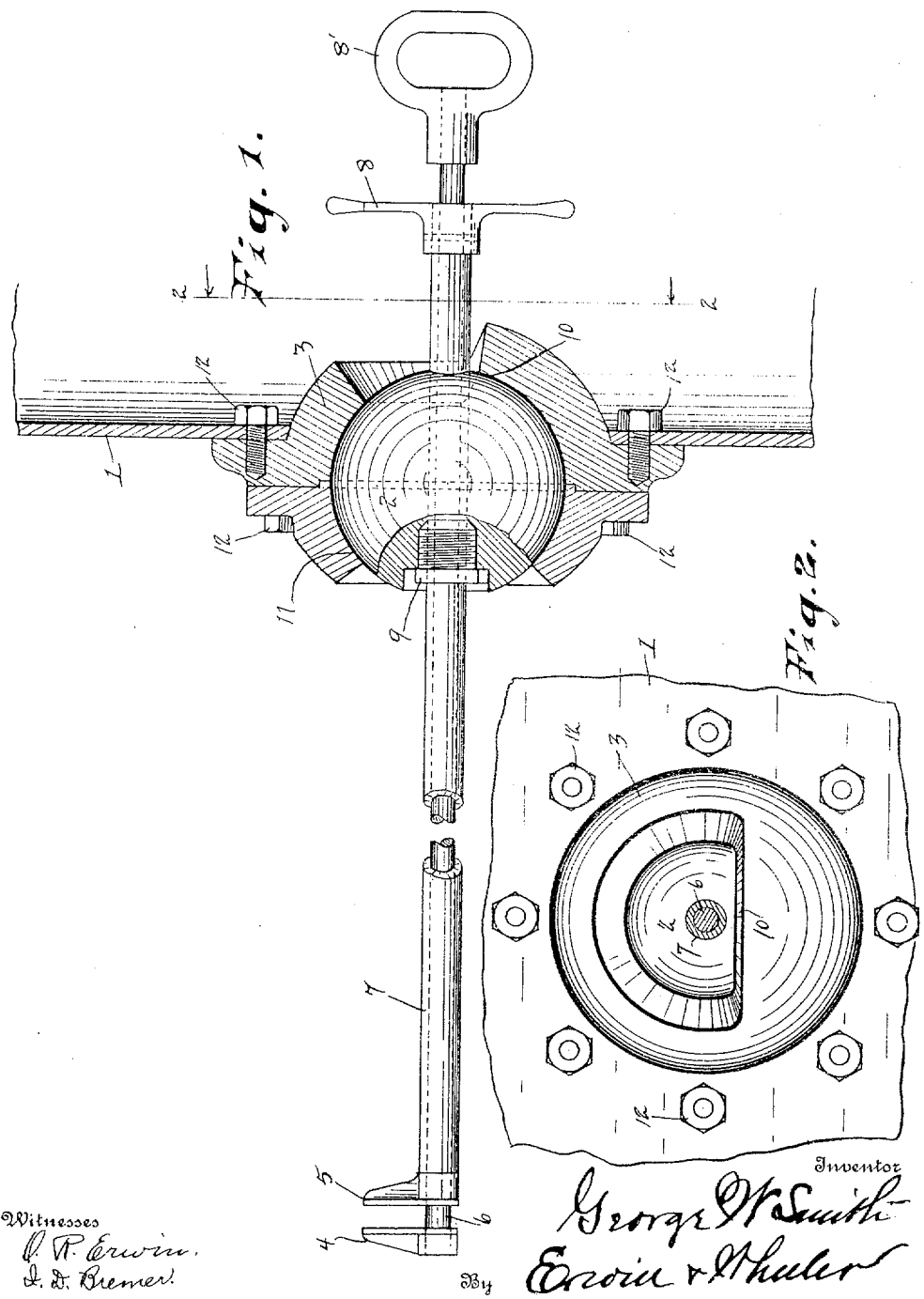

UNITED STATES PATENT OFFICE.

GEORGE W. SMITH, OF MILWAUKEE, WISCONSIN, ASSIGNOR TO MARINE SALVAGE COMPANY, OF MILWAUKEE, WISCONSIN, A CORPORATION OF WISCONSIN.

DIVING APPARATUS.

975,727.       Specification of Letters Patent.       Patented Nov. 15, 1910.

Application filed March 21, 1910. Serial No. 550,591.

*To all whom it may concern:*

Be it known that I, GEORGE W. SMITH, a citizen of the United States, residing at Milwaukee, county of Milwaukee, and State of Wisconsin, have invented new and useful Improvements in Diving Apparatus, of which the following is a specification.

My invention relates to improvements in that class of diving apparatus, for which Letters Patent, No. 503,753, were issued to me August 22, 1893, and my present invention pertains more especially, among other things, to the construction of the ball and socket joint in which the gripping jaws are slidably supported and through which such jaws are operated from the interior of the bell.

As heretofore constructed, the friction of the ball against the socket, due to the exterior pressure of the water when the bell is submerged, has been so great that it has been almost impossible to manipulate the jaw supporting shafts or to give them the inclination required in using the same, while by my present improvement, the friction of such parts is greatly reduced, whereby such jaws are more easily operated.

The construction of my invention is explained by reference to the accompanying drawings, in which—

Figure 1 represents a vertical section of one side of a diving bell provided with my improved ball and socket joint, and Fig. 2 is a detail thereof.

Like parts are represented by the same reference numerals in both views.

1 represents the side of a diving bell, the construction of which is more fully set forth and described in said patent.

2 represents the ball and 3 the socket, in which such ball operates and by which the clamping jaws 4 and 5 are supported and operated. The clamping jaw 4 is supported from the central shaft 6 and the clamping jaw 5 is supported from the hollow exterior shaft 7, and such jaws are moved toward and from each other by turning the operating handles 8, 8′, substantially as shown and described in said patent, while said shafts are moved longitudinally backwardly and forwardly in the ball and socket through the stuffing nut 9, also as more fully set forth and described in said patent.

My present improvement pertains more especially, as stated, to the construction of the socket 3. As heretofore constructed, the bearings of the socket 3 terminated near the upper and lower surfaces of the ball 2, whereby as the ball was forced inwardly by the exterior pressure of the water against it, a wedge action was given to the ball between such upper and lower surfaces, whereby the friction of the bearings is so intense that it becomes almost impossible to move the ball in its socket. By my present improvement, however, the socket is provided with a semi-circular aperture for the reception of the hollow shaft 7 and the lower side 10 of the socket is extended upwardly to or near the horizontal center of the socket, whereby the inward pressure of the water against the ball is brought to bear more direct against the opposing wall of the socket at the point 10, whereby the wedge action heretofore experienced by the construction shown in said patent is overcome and the ball is more easily and freely moved in its inclosing bearings. The ball inclosing socket is preferably formed in two parts 3 and 11, the part 3 being located upon the interior side of the ball and the opposing surfaces of the ball and socket are ground so as to form a water tight joint, while the exterior portion of the socket 11 serves to retain the ball in place. 12, 12, are bolts for securing the ball and socket to the vertical walls of the bell 1.

Having thus described my invention, what I claim as new, and desire to secure by Letters Patent, is—

1. In a ball and socket joint for diving apparatus, the combination of a ball provided with slidable bearings for the reception of a slidable shaft, a slidable shaft located in said bearings, a socket for the reception of said ball provided upon two opposing sides with an aperture for the reception of said shaft, the inner walls of such socket being extended upwardly from the lower side of said ball to a point at or near its horizontal center, whereby the upward extension of said socket forms a resisting wall to the direct inward pressure of the water against said ball, while the upper side of said aperture permits of the required inclination and movement of said shaft.

2. In a ball and socket joint for diving apparatus, the combination of a ball provided with slidable bearings for the reception of a slidable shaft, a slidable shaft located in said bearings, a socket for the reception of said ball provided upon its inner side with a semi-circular aperture for the reception of said shaft, the base or lower side of said aperture terminating at or slightly below the horizontal center of said ball and socket, whereby space is provided in said aperture for the upward inclination of said shaft, while the lower side of said socket forms a resisting wall to the direct inward pressure of the water against said ball, means for retaining said ball in said socket, and means for securing said ball and socket to the exterior walls of the diving bell, all substantially as and for the purpose specified.

In testimony whereof I affix my signature in the presence of two witnesses.

GEORGE W. SMITH.

Witnesses:
O. R. ERWIN,
JAS. B. ERWIN.